United States Patent
Chiu et al.

(10) Patent No.: US 12,406,004 B1
(45) Date of Patent: Sep. 2, 2025

(54) PERSONALIZED QUERY AUTO-COMPLETION

(71) Applicant: RAKUTEN GROUP, INC., Tokyo (JP)

(72) Inventors: Justin Chiu, Tokyo (JP); Mei Wong, Tokyo (JP); Stian Lysne, Tokyo (JP); Runar Olsen, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 0 days.

(21) Appl. No.: 18/756,749

(22) Filed: Jun. 27, 2024

(51) Int. Cl.
*G06F 16/24* (2019.01)
*G06F 16/2457* (2019.01)
*G06F 16/9032* (2019.01)
*G06Q 30/0601* (2023.01)

(52) U.S. Cl.
CPC .. *G06F 16/90328* (2019.01); *G06F 16/24578* (2019.01); *G06Q 30/0631* (2013.01)

(58) Field of Classification Search
CPC ........ G06F 16/90328; G06F 16/24578; G06Q 30/0631
See application file for complete search history.

(56) References Cited

U.S. PATENT DOCUMENTS

| | | | | |
|---|---|---|---|---|
| 10,248,663 | B1* | 4/2019 | Keisler | G06N 3/08 |
| 2017/0185581 | A1* | 6/2017 | Bojja | G06V 30/19173 |
| 2021/0073215 | A1* | 3/2021 | Srinivasaraghavan | G06F 16/2425 |
| 2021/0174164 | A1* | 6/2021 | Hsieh | G06F 16/24578 |
| 2022/0092118 | A1* | 3/2022 | Tomasio | G06F 18/24 |
| 2022/0327151 | A1 | 10/2022 | Huang et al. | |
| 2022/0335088 | A1* | 10/2022 | Li | G06N 3/08 |
| 2023/0245654 | A1* | 8/2023 | Shrivastava | G10L 15/1822 704/243 |
| 2023/0273776 | A1* | 8/2023 | Wang | G06F 8/33 717/106 |
| 2025/0165678 | A1* | 5/2025 | Low | G06F 30/27 |

FOREIGN PATENT DOCUMENTS

| | | |
|---|---|---|
| EP | 3 879 413 A1 | 9/2021 |
| JP | 2022-530688 A | 6/2022 |
| WO | 2021/139222 A1 | 7/2021 |

* cited by examiner

*Primary Examiner* — Merilyn P Nguyen (74) *Attorney, Agent, or Firm* — Sughrue Mion, PLLC (57) ABSTRACT

An information processing apparatus acquires a prefix input on an EC (E-Commerce) site by a user, acquires a context representing a feature relating to a search on the EC site by the user, generates a plurality of search query candidates, based on the prefix, and reranks the plurality of search query candidates, using a result generated by inputting the plurality of search query candidates and the context to a natural language processing model trained using information relating to purchases on the EC site by the user.

13 Claims, 7 Drawing Sheets

| POSITIVE PAIRS 420 | NEGATIVE PAIRS 421 |
|---|---|
| (BRAND A, BRAND B) | (BRAND A, BRAND D) |
| (BRAND B, BRAND C) | (BRAND A, BRAND E) |
| (BRAND C, BRAND A) | (BRAND A, BRAND F) |
| | (BRAND B, BRAND D) |
| | (BRAND B, BRAND E) |
| | (BRAND B, BRAND F) |
| | (BRAND C, BRAND D) |
| | (BRAND C, BRAND E) |
| | (BRAND C, BRAND F) |
| | (BRAND D, BRAND E) |
| | (BRAND D, BRAND F) |
| | (BRAND E, BRAND F) |

PERSONALIZED QUERY AUTO-COMPLETION

TECHNICAL FIELD

The present invention relates to a technology for personalized query auto-completion.

BACKGROUND ART

In recent years, query auto-completion (also referred to as query suggestion) has been widely utilized in search engines. Query auto-completion is a task that predicts and suggests a complete search query intended by a user, based on a prefix of a search query (character string) input by the user. Query auto-completion allows the user to input an intended search query with fewer keystrokes (i.e., by reducing the number of characters to be input) and obtain search results that depend thereon. For example, on an EC (E-Commerce) site that implements query auto-completion, the user is able to obtain a search result in response to selecting an intended search query and efficiently utilize a service provided by the site.

Since preferences, search tendencies, and the like differ from user to user, the query auto-completion is preferably optimized for each user, that is, personalized. JP 2022-530688T discloses training a sorting (reranking) model, based on a prefix input by the user in the past, a plurality of search query candidates (Points of Interest (POI)) corresponding to the prefix, and a search query selected by the user. The training is performed using a positive pair (pair of prefix and selected search query) and one or more negative pairs (pairs of prefix and search query not selected). Furthermore, J P 2022-530688T discloses reranking search query candidates, by inputting a prefix currently input by the user to the trained sorting model. JP 2022-530688T is an example of related art.

SUMMARY OF THE INVENTION

According to the technology disclosed in JP 2022-530688T, by using a sorting model trained based on prefixes input by the user in the past and search queries selected by the user, it becomes possible to rerank search query candidates in accordance with past search tendencies of the user. On the other hand, if query auto-completion is applied to an EC site, more personalized reranking can be possible, by considering purchase-related information such as the purchase history of the user. However, such a mechanism for reranking search query candidates that takes into account information relating to purchases by a user on an EC site has not been proposed to date.

In view of the above issue, the present disclosure discloses a mechanism for reranking personalized search query candidates on an EC site.

One aspect of an information processing apparatus according to the present invention includes: a prefix acquisition unit configured to acquire a prefix input on an EC (E-Commerce) site by a user; a context acquisition unit configured to acquire a context representing a feature relating to a search on the EC site by the user; a candidate acquisition unit configured to generate a plurality of search query candidates, based on the prefix; and a reranking unit configured to rerank the plurality of search query candidates, using a result generated by inputting the plurality of search query candidates and the context to a natural language processing model trained using information relating to purchases on the EC site by the user.

One aspect of an information processing method according to the present invention includes: acquiring a prefix input on an EC (E-Commerce) site by a user; acquiring a context representing a feature relating to a search on the EC site by the user; generating a plurality of search query candidates, based on the prefix; and reranking the plurality of search query candidates, using a result generated by inputting the plurality of search query candidates and the context to a natural language processing model trained using information relating to purchases on the EC site by the user.

According to the present disclosure, a mechanism for reranking personalized search query candidates on an EC site is provided.

EMBODIMENTS OF THE INVENTION

Figure 1:
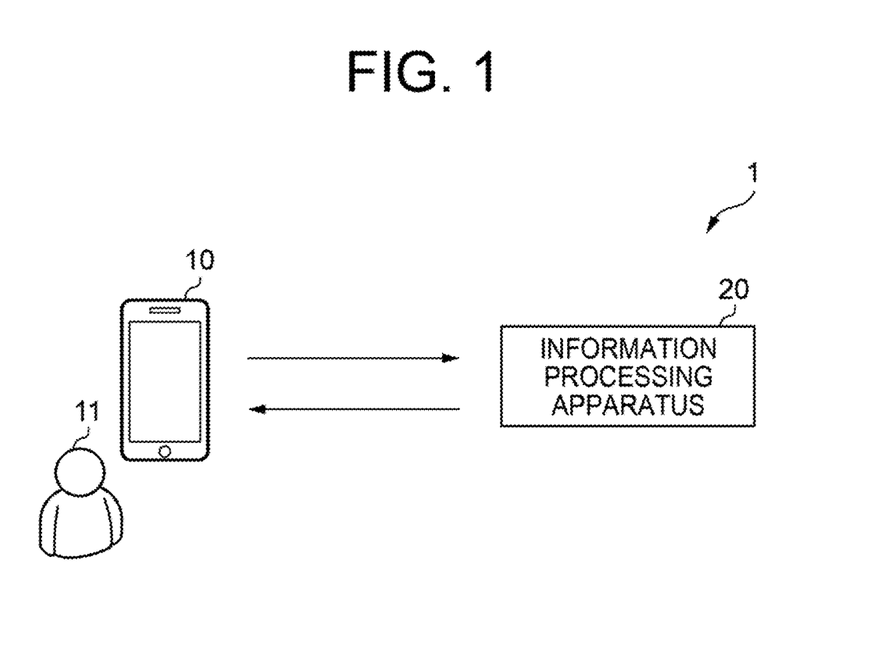
FIG. 1 shows an example configuration of an information processing system.

Embodiments of the present invention will now be described in detail with reference to the accompanying drawings. Out of the component elements described below, elements with the same functions have been assigned the same reference numerals, and description thereof is omitted. Note that the embodiments disclosed below are mere example implementations of the present invention, and it is possible to make changes and modifications as appropriate according to the configuration and/or various conditions of the apparatus to which the present invention is to be applied. Accordingly, the present invention is not limited to the embodiments described below. The combination of features described in these embodiments may include features that are not essential when implementing the present invention.
Configuration of Information Processing System FIG. 1 shows an example configuration of an information processing system 1 according to the present embodiment. The information processing system 1 is constituted to include a user device 10 and an information processing apparatus 20. The information processing apparatus 20 is a server apparatus that manages websites including an electronic commerce site (E-Commerce (EC) site) and provides a service of the EC site to a plurality of user devices including the user device 10. Note that the EC site provided by the information processing apparatus 20 is not limited to one EC site and a plurality of EC sites may be provided. For example, the information processing apparatus 20 may provide a plurality of EC sites corresponding to a plurality of different services (e.g., shopping service, travel service, etc.). A user 11 of the user device 10 is able to access the EC site provided by the information processing apparatus 20 and input one or more characters (prefix) at the beginning of a search query (character string) for searching for a desired item (search target item) in a search window (input field) of the site. When a prefix is input by the user 11, the prefix is transmitted from the user device 10 in real time to the information processing apparatus 20. Upon receiving the prefix transmitted from the user device 10, the information processing apparatus 20 generates a plurality of search query candidates, based on the prefix, and transmits the generated search query candidates to the user device 10. The information processing apparatus 20 according to the present embodiment reranks the search query candidates and transmits the reranked search query candidates to the user device 10. The user device 10 receives the search query candidates transmitted from the information processing apparatus 20 and displays the received search query candidates on a display unit (display surface). The user 11 selects (determines) one search query from the displayed search query candidates, and the user device 10 transmits the selected search query to the information processing apparatus 20. The information processing apparatus 20 receives the search query transmitted from the user device 10 and transmits (delivers) information (e.g., webpage, web service, etc.) corresponding to the search query to the user device 10.

The user device 10 is, for example, a device such as a smartphone or a tablet, and is configured to be capable of communicating with the information processing apparatus 20, via a public network such as an LTE (Long Term Evolution) network or a wireless communication network such as a wireless LAN (Local Area Network). The user device 10 has a display unit (display surface) such as a liquid crystal display, and the user 11 of the user device 10 is able to perform various operations through a GUI (Graphical User Interface) provided on the liquid crystal display. The operations include various operations on images and other content displayed on a screen, such as a tap operation, slide operation, and scroll operation with a finger, stylus, or the like.

Note that the user device 10 is not limited to a device in a form such as shown in FIG. 1 and may be a device such as a desktop PC (Personal Computer) or a laptop PC. In that case, operations by the user 11 can be performed using an input device such as a mouse or a keyboard. Also, the display unit may be provided separately from the user device 10.

In the present embodiment, input information such as prefixes transmitted from the user device 10 to the information processing apparatus 20 can be linked to information (hereinafter, also referred to as a user ID (identifier)) that identifies the user 11 on the EC site, date-time of input, position information of the user device 10, and the like. The position information of the user device 10 can be acquired using GPS (Global Positioning System). Also, the input information may be linked to attributes (hereinafter also referred to as user attributes) of the user device 10 or the user 11. The user attributes can include demographic information. Demographic information is a demographic user attribute such as gender, age, area of residence, occupation, family composition, and the like. The user attributes can be acquired from information that the user 11 registered in order to utilize the EC site provided by the information processing apparatus 20.

Also, in the present embodiment, the search target item of the user 11 is an item that can be provided by the EC site operated by the information processing apparatus 20, and can be a tangible or intangible product, service or the like. For example, in terms of digital content services, there are items such as moving image content like movies and animation, and still image content like photos and illustrations. Also, in terms of online shopping services, there are items such as intangible or tangible products that are available through online shopping. Also, in terms of travel services, there are items such as information and reservations relating to hotels, package tours, and means of transportation. Also, in terms of mobile services, there are items such as mobile devices, public networks/Internet connections, and communication charges. Also, in terms of sports and cultural services, there are items such as events like sports events and concerts and products sold at events.

Functional Configuration of Information Processing Apparatus 20

Next, an example functional configuration of the information processing apparatus 20 according to the present embodiment will be described. The information processing apparatus generates a plurality of search query candidates, based on a prefix received from the user device 10, and acquires a context representing a feature relating to the search on the EC site by the user 11. Also, the information processing apparatus 20 trains a natural language model 121, based on information relating to the past purchase history of the user 11. The information processing apparatus 20 then reranks the plurality of search query candidates, using the result obtained by inputting the plurality of search query candidates and the context to the trained natural language processing model 121. After reranking the search query candidates, the information processing apparatus 20 provides the reranked search query candidates to the user device 10.

Figure 2:
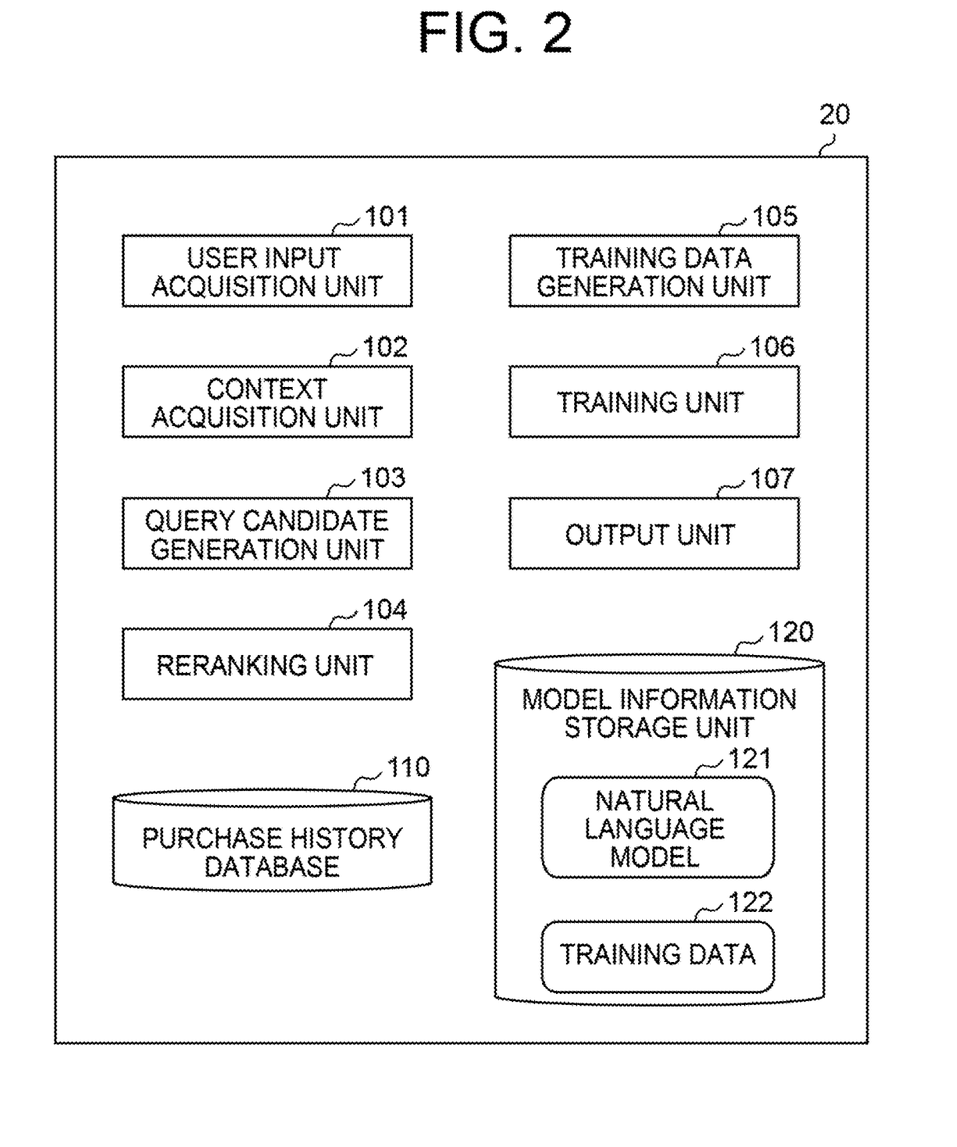
FIG. 2 shows an example functional configuration of an information processing apparatus.

An example of the functional configuration of the information processing apparatus according to the present embodiment is shown in FIG. 2. Note that the functional configuration shown in FIG. 2 mainly shows a configuration for the information processing apparatus 20 to realize generation of a plurality of search query candidates based on a prefix acquired from the user device 10 and reranking of the generated search query candidates, and other functions are omitted.

The information processing apparatus 20 is provided with a user input acquisition unit 101, a context acquisition unit 102, a query candidate generation unit 103, a reranking unit 104, a training data generation unit 105, a training unit 106, an output unit 107, a purchase history database 110, and a model information storage unit 120. The purchase history database 110 is configured to be capable of storing information of the purchase histories of a plurality of users including the user 11. The model information storage unit 120 is configured to be capable of storing the natural language model 121 and training data 122. The natural language model 121 is a learning model configured to extract (encode) features of input language information and generate (derive) feature vectors (embedding vectors) representing features of the language information. That is, the feature vectors correspond to vector representation of features of the language information. The model information storage unit 120 can store the architecture of the natural language model 121, various parameters derived by learning, and the like. The training data 122 can include training data generated by the training data generation unit 105 in order to train the natural language model 121.

The user input acquisition unit 101 receives information input to the user device 10 by the user 11 from the user device 10. For example, the user input acquisition unit 101 acquires prefixes input to the user device 10 by the user 11.

Every time the user inputs a prefix of a search query for searching for a desired item (search target item), the input prefix is transmitted and the user input acquisition unit 101 acquires the prefix. Also, the user input acquisition unit 101 is able to acquire, from the user device 10, a search query selected by the user 11 from a plurality of search query candidates provided by the information processing apparatus 20 or a full-word search query input by the user 11.

Each time the user 11 purchases an item on the EC site provided by the information processing apparatus 20, the user input acquisition unit 101, furthermore, stores information of the purchased item and information of the user 11 in association with each other in the purchase history database 110 as a purchase history (item purchase history). The information of the item can include the brand name of the item, the genre or category of the item, information of the store (merchant) that sells the item, the price of the item, and the like. The information of the user 11 can include the user ID of the user 11, the date-time of purchase, user attributes, and the like.

The context acquisition unit 102 acquires a context representing a feature relating to the search by the user 11. In the present embodiment, a context is the search query that was last input by the user 11 prior to inputting a prefix on the same EC site as the EC site that the user 11 is currently viewing, that is, in the same (one) browsing session. A browsing session refers to a series of communications by the user 11 from the beginning to the end of access to a given website. The context acquisition unit 102 is able to acquire, from the user input acquisition unit 101, information of the user 11 relating to the EC site being accessed, including search queries input by the user 11, in one browsing session, and temporarily store the acquired information. The search query that was last input can be a search query selected by the user 11 prior to inputting a prefix, from a plurality of search query candidates provided by the information processing apparatus 20. Alternatively, the search query that was last input can be a search query input as a full word by the user 11 prior to inputting a prefix.

The search query last input by the user 11 can be said to reflect features relating to the search by the user 11 in real time on the same EC site. Also, given that search queries input by the user are temporarily stored in one browsing session, the search queries do not need to be retrieved from an input log of past browsing sessions of the user 11. The context acquisition unit 102 is thereby able to acquire contexts of the user 11 in real time, and without increasing the storage capacity or processing load. Note that, in the present embodiment, a context is the search query last input by the user 11 on the same EC site, but is not limited thereto, and may be any other information that represents features relating to searches by the user 11. For example, the context may be a word that the user 11 has input more than a predetermined number of times on the same EC site or information related to that word.

The query candidate generation unit 103 generates, based on a prefix acquired by the user input acquisition unit 101, a plurality of search query candidates that depend on the prefix. In the present embodiment, the query candidate generation unit 103 auto-completes the prefix using an existing technology and generates a plurality of search query candidates. For example, the query candidate generation unit 103 can generate a plurality of search query candidates from the prefix, by using a library that provides an auto-completion function. The query candidate generation unit 103 may generate a plurality of search query candidates each time a prefix is acquired by the user input acquisition unit 101. The number of search query candidates is settable by an operator of the information processing apparatus 20 or by the information processing system 1, for example, and there may be around eight search query candidates for each prefix.

The reranking unit 104 reranks the plurality of search query candidates generated by the query candidate generation unit 103, based on the context acquired by the context acquisition unit 102. In the present embodiment, the reranking unit 104 reranks the search query candidates, using the natural language model 121 trained by the training unit 106. Specifically, the reranking unit 104 inputs each of the plurality of search query candidates (language information) to the trained natural language model 121 and generates a plurality of query feature vectors respectively representing features of the search query candidates. Also, the reranking unit 104 inputs the context (language information) to the trained natural language model 121 and generates a context feature vector representing a feature of the context. The plurality of query feature vectors and the context feature vector are then embedded in a common vector space. The plurality of query feature vectors and the context feature vector embedded in the common vector space respectively correspond to query embedding and context embedding. The reranking unit 104 calculates the distance from each of the plurality of query feature vectors to the context feature vector in the common vector space, and reranks the plurality of search query candidates, based on the calculated distances.

The training data generation unit 105 generates a training data set for training the natural language model 121. In the present embodiment, the training data generation unit 105 generates training data, using the purchase history of the user 11 stored in the purchase history database 110. As aforementioned, since information of purchased items is associated with the user ID of the user 11 in the purchase history, the training data generation unit 105 is able to retrieve information of items purchased by the user 11 from the purchase history database 110. The training data generation unit 105 generates a plurality of positive pairs from the information of two items purchased by the user 11 after browsing the EC site. Given that the positive pairs include information of items actually purchased by the user 11, the purchasing tendencies of the user 11 can be indicated. Also, the training data generation unit 105 generates a plurality of negative pairs, using the information of items that have not been purchased. In the present embodiment, as will be described later, the brand names of items are used as the information of items. The training data generation unit 105 stores the generated training data in the model information storage unit 120 as the training data 122.

The training unit 106 trains the natural language model 121, using the training data (training data 122) generated by the training data generation unit 105. The natural language model 121 before being trained by the training unit 106 is, for example, a transformer-based natural language processing model, and is a pretrained BERT (Bidirectional Encoder Representations from Transformers), for example. The training unit 106 finetunes the natural language processing model 121, using the training data generated by the training data generation unit 105.

Specifically, the training unit 106 inputs the pieces of information of each positive pair generated by the training data generation unit 105 to the natural language model 121 and generates feature vectors of the positive pair. The training unit 106 then embeds the feature vectors of each positive pair in the common vector space and trains the natural language model 121 so as to minimize the distance between the feature vectors of the positive pair. Also, the training unit 106 inputs the pieces of information of each negative pair generated by the training data generation unit 105 to the natural language model 121 and generates feature vectors of the negative pair. The training unit 106 then embeds the feature vectors of each negative pair in the common vector space and trains the natural language model 121 so as to maximize the distance between the feature vectors of the negative pair. As a result, the natural language model 121 is trained such that, when the distance between the feature vectors embedded in the common vector space is short, the relevance of the feature represented by the feature vectors is high, and, when the distance between the feature vectors is long, the relevance of the feature represented by the feature vectors is low. In this way, the natural language model 121 is configured to receive two inputs (positive pair or negative pair) and generate a feature vector for each of the inputs, and thus functions as a dual encoder.

The output unit 107 provides (outputs) various information generated by the information processing apparatus 20 to the user device 10. In the present embodiment, the output unit 107 provides (outputs) search query candidates reranked by the reranking unit 104 to the user device 10.

Hardware Configuration of Information Processing Unit

Figure 3:
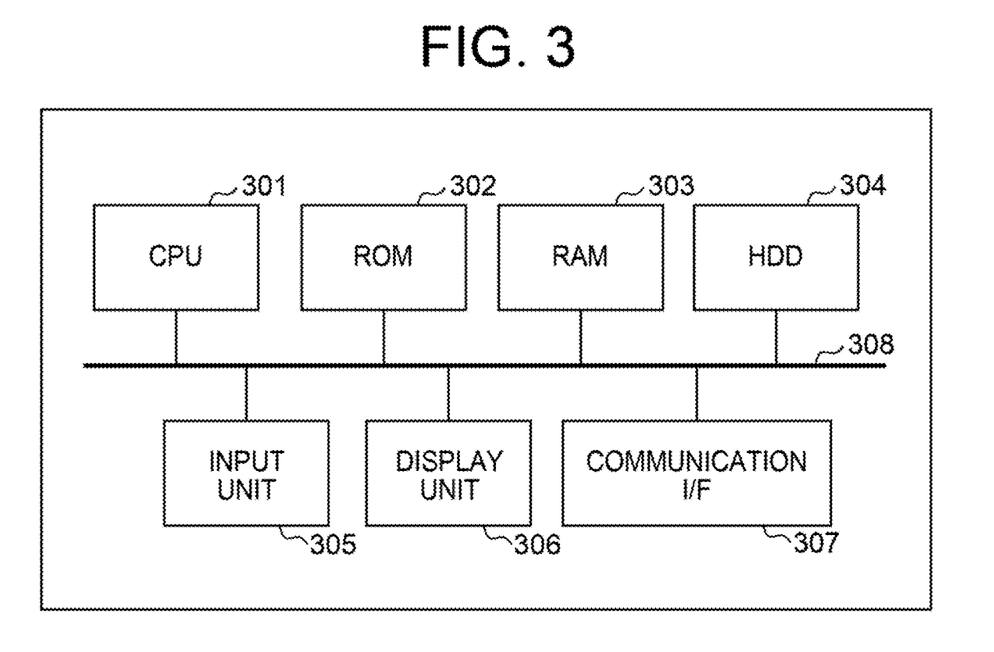
FIG. 3 shows an example hardware configuration of the information processing apparatus.

Next, an example hardware configuration of the information processing apparatus 20 will be described. FIG. 3 is a block diagram showing an example of the hardware configuration of the information processing apparatus 20 according to the present embodiment.

The information processing apparatus 20 according to the present embodiment can be implemented on one or a plurality of any computer, mobile device, or any other processing platform.

Referring to FIG. 3, an example in which the information processing apparatus 20 is implemented on a single computer is shown, but the information processing apparatus 20 according to the present embodiment may be implemented on a computer system that includes a plurality of computers. The plurality of computers may be connected to each other communicatively by a wired or wireless network.

As shown in FIG. 3, the information processing unit 20 may be provided with a CPU (Central Processing Unit) 301, a ROM (Read Only Memory) 302, a RAM (Random Access Memory) 303, an HDD (Hard Disk Drive) 304, an input unit 305, a display unit 306, a communication I/F (interface) 307, and a system bus 308. The information processing apparatus 20 may also be provided with an external memory.

The CPU 301 functions to comprehensively control the operations of the information processing apparatus 20, and controls the constituent units (302 to 307) via the system bus 308, which is a data transmission path. The ROM 302 is a non-volatile memory that stores control programs or the like necessary for the CPU 301 to execute processing. Note that the programs may also be stored in a non-volatile memory such as the HDD 304 or an SSD (Solid State Drive) or in an external memory such as a removable storage medium (not shown). The RAM 303 is a volatile memory and functions as a main memory, work area, and the like of the CPU 301. That is, the CPU 301 realizes various functional operations by loading necessary programs and the like into the RAM 303 from the ROM 302 when executing processing and executing the programs and the like. The RAM 303 can include the purchase history database 110 and model information storage unit 120 shown in FIG. 2.

The HDD 304 stores various data, information and the like necessary when the CPU 301 performs processing using the programs, for example. Also, various data, information, and the like obtained by the CPU 301 performing processing using the programs and the like, for example, are stored in the HDD 304.

The input unit 305 is constituted by a keyboard, a pointing device such as a mouse, or the like.

The display unit 306 is constituted by a monitor such as a liquid crystal display (LCD). The display unit 306 may function as a GUI (Graphical User Interface), by being constituted in combination with the input unit 305. Input operations (including selection operations, etc.) by the user described below can be performed via the input unit 305, a GUI, or the like.

The communication I/F 307 is an interface that controls communication between the information processing apparatus 20 and external devices. The communication I/F 307 provides an interface with a network and executes communication with external devices via the network. Various data, parameters, and the like are transmitted to and received from external devices via the communication I/F 307. In the present embodiment, the communication I/F 307 may execute communication via a wired LAN (Local Area Network) or a dedicated line conforming to a communication standard such as Ethernet (registered trademark). The network that is usable in the present embodiment is, however, not limited thereto and may be constituted as a wireless network. This wireless network includes a wireless PAN (Personal Area Network) such as Bluetooth (registered trademark), ZigBee (registered trademark), and UWB (Ultra Wide Band). Also included is a wireless LAN (Local Area Network) such as Wi-Fi (Wireless Fidelity) (registered trademark) and a wireless MAN (Metropolitan Area Network) such as WiMAX (registered trademark). A wireless WAN (Wide Area Network) such as 4G and 5G is further included. Note that as long as the network communicatively connects devices to each other and communication is possible, the standard, scale, and configuration of communication are not limited to the above.

At least some of the functions of the elements of the information processing apparatus shown in FIG. 2 can be realized by the CPU 301 executing programs. At least some of the functions of the elements of the information processing apparatus 20 shown in FIG. 2 may, however, be operated as dedicated hardware. In this case, the dedicated hardware operates under the control of the CPU 301.

Flow of Processing by Information Processing Apparatus 20

Next, the flow of processing by the information processing apparatus 20 according to the present embodiment will be described. First, the information processing apparatus 20 trains the natural language processing model 121, and reranks a plurality of search query candidates that depend on a prefix input by the user 11, using the trained natural language model 121. (1) The procedure of processing for training the natural language model 121 and (2) the procedure of processing for reranking search query candidates will be described below in the stated order.

(1) Procedure of Processing for Training Natural Language Model 121

Figure 4A:
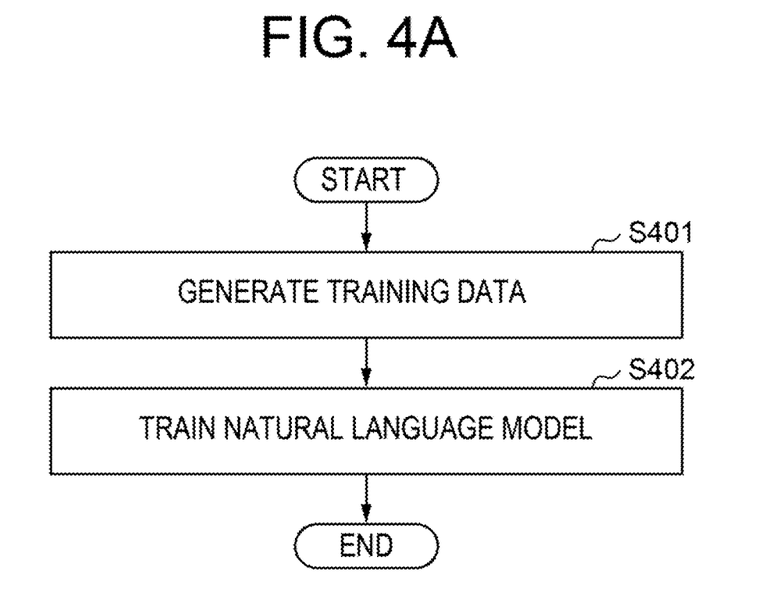
FIG. 4A shows a flowchart of training processing that is executed by the information processing apparatus.

The procedure of processing for training the natural language model 121 that is executed by the information processing apparatus 20 according to the present embodiment will be described, with reference to FIGS. 4A to 4C. FIG. 4A shows a flowchart of training processing that is executed by the information processing apparatus 20. Note that the purchase history database 110 is assumed to store the purchase histories of items by a plurality of users including the user 11, among a plurality of items being sold on the EC site provided by the information processing apparatus 20.

In step S401, the training data generation unit 105 generates training data. In the present embodiment, the training data generation unit 105 generates training data including positive pairs and negative pairs from information of a plurality of purchased items that have been purchased by the user 11 and a plurality of non-purchased items that have not been purchased by the user 11, based on the purchase history of the user 11 stored in the purchase history database 110. Specifically, the training data generation unit 105 generates training data that includes a positive pair which is a pair of pieces of information of two items, among a plurality of purchased items, and a negative pair which is a pair of pieces of information of two items, among the plurality of items, with at least one piece thereof being information of one non-purchased item among a plurality of non-purchased items. Note that with regard to the purchase history data stored in the purchase history database 110, data older than a given period from the present (e.g., time of training the natural language model 121) may be deleted, in order to generate positive pairs that better represent the purchasing tendencies. In the present embodiment, the brand names of items are used as the information of items.

Figure 4B:
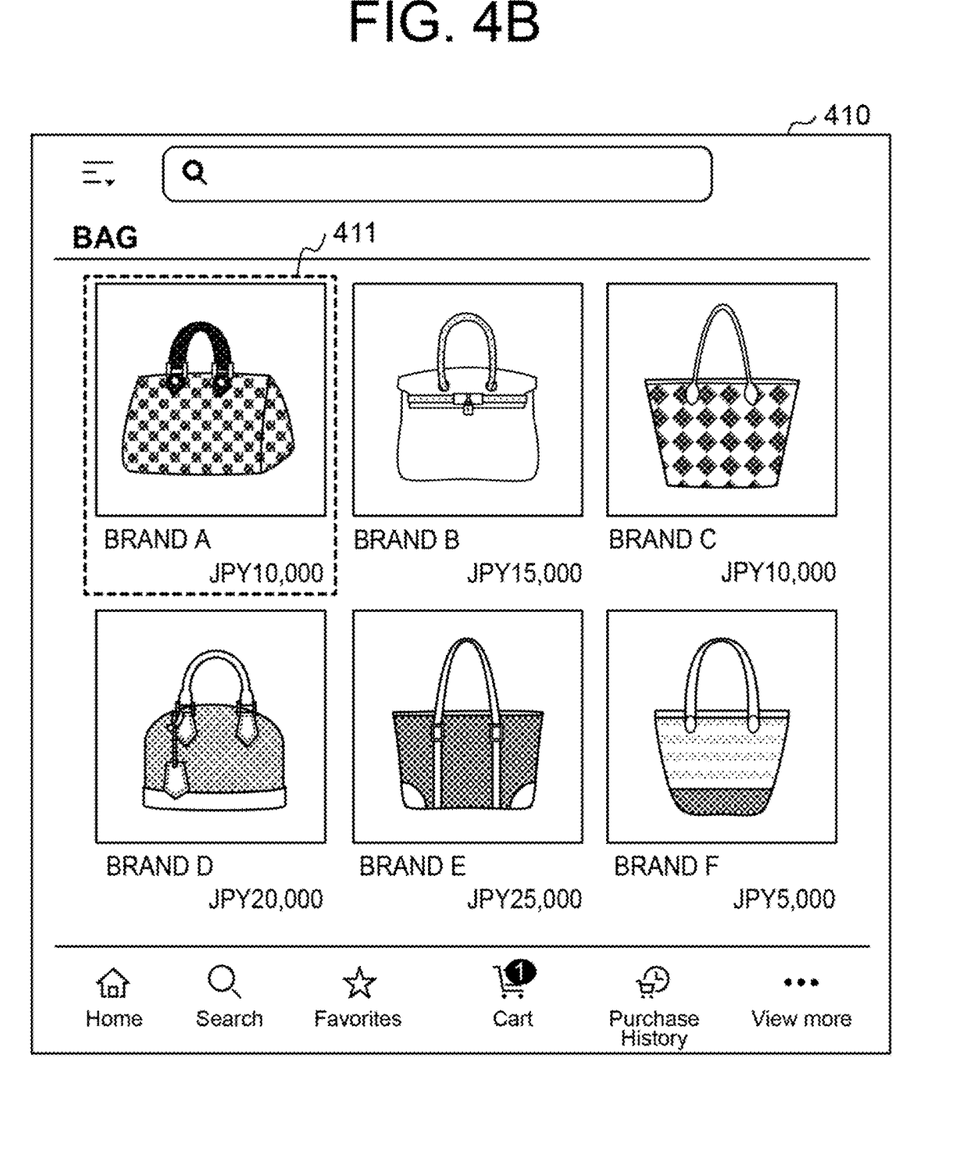
FIG. 4B shows an example of a screen of a sales page for bags on an EC site.
Figure 4C:
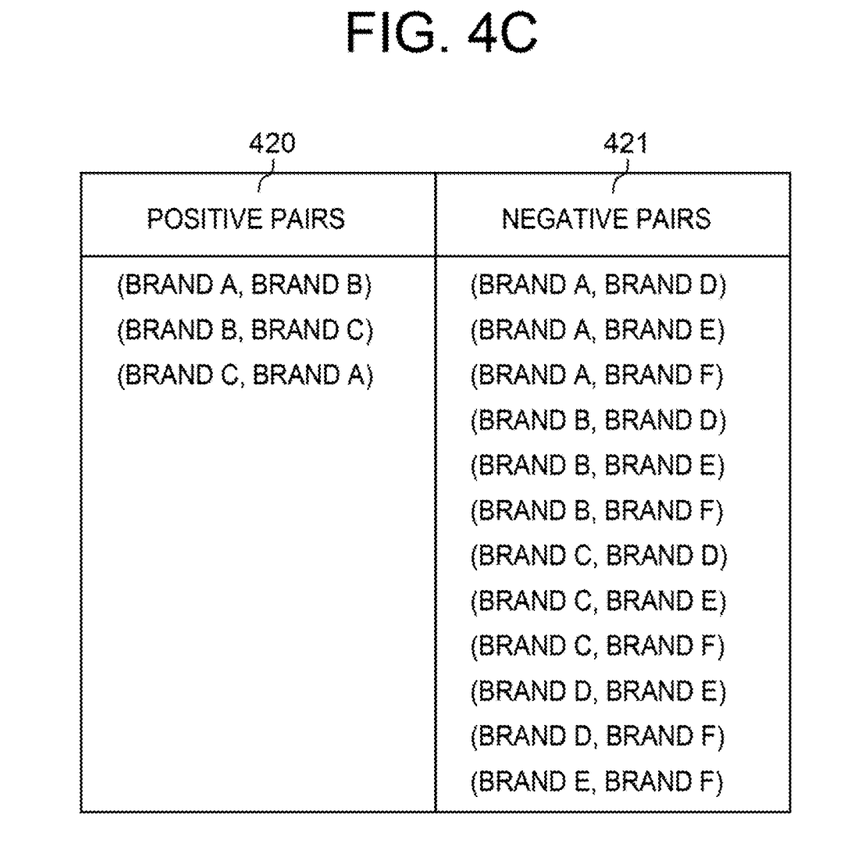
FIG. 4C shows an example of training data.

FIG. 4B shows an example of a screen 410 of a sales page for bags, as an example of a sales page for items on an EC site provided by the information processing apparatus 20. The bags being sold on the bag sales page shown on the screen 410 may be bags that are sold by different stores (merchants) or may be bags that are sold by the same store. On the screen 410, the items for purchase are bags, and bags from brands A to F are being sold. On the screen 410, the brands A to F are each assumed to represent a brand name. When a user purchases any of the bags of brands A to F by operating the screen 410, the user ID of the user and the information of the purchased bag (item) are stored in association with each other in the purchase history database 110.

On the screen 410 in FIG. 4B, users are able to select and purchase a desired bag from the bags of brands A through F. For example, a user, when purchasing a bag of brand A, proceeds to the purchase procedure after having selected an area 411 and completes payment for the purchase. Here, assume that the user 11 purchases the bags of brand A, brand B, and brand C, among the bags shown on the screen 410, at the same timing or at different timings (e.g., during a given period). In response to the purchases, the item purchase history of the user 11 in which the user ID of the user 11 is associated with information of the bags of brand A, brand B, and brand C is stored in the purchase history database 110. In the present embodiment, the brand names of the items, among the information of the items stored in the purchase history database 110, are used as the information of the items for generating training data. Therefore, the training data generation unit 105 retrieves the item purchase history for the user 11 from the purchase history database 110 and generates pairs of two brand names out of brand A, brand B, and brand C, which are the purchased items, as positive pairs. That is, when targeting the bags of brands A to F shown in FIG. 4B, the training data generation unit 105 generates, as positive pairs, three pairs, namely, brand A-brand B, brand B-brand C, and brand C-brand A. FIG. 4C shows an example of training data in the case of the present example, and, here, positive pairs 420 are constituted by three pairs: brand A-brand B, brand B-brand C, and brand C-brand A.

Also, when targeting the bags of brands A to F shown in FIG. 4B, the training data generation unit 105 generates, as negative pairs, pairs of brand names that include at least one of the brand names of the bags of brands D to F that have not been purchased by the user 11. Therefore, in the case of the present example, negative pairs 421 in FIG. 4C are constituted by the following pairs: brand A-brand D, brand A-brand E, brand A-brand F, brand B-brand D, brand B-brand E, brand B-brand F, brand C-brand D, brand C-brand E, brand C-brand F, brand D-brand E, brand D-brand F, and brand E-brand F.

Note that, in the present embodiment, the brand names of the items are used as the information of the items for the positive pairs and the negative pairs of training data, but information other than the brand name, such as the genre of the items, the category of the items, and the store that sells the items, may be used. Also, the training data generation unit 105 generates pairs of brand names of items, but pairs of an item name of an item and other information of the item may be generated as training data. For example, when the user 11 purchases the bag of brand A, the training data generation unit 105 may generate a pair of brand A (brand name) and bag (name of the genre or category of the item) as a positive pair. Also, when the user 11 purchases the bag of brand A, the training data generation unit 105 may generate a pair of brand A (brand name) and a user attribute or position information of the user 11 as a positive pair.

Next, the training data generation unit 105 stores the generated training data in the model information storage unit 120 as the training data 122. The training data generation unit 105 can store the generated training data in the model information storage unit 120 in association with the user ID of the user. The training data generation unit 105 may generate training data, each time the item purchase procedure on the EC site is completed by the user and the purchase history database 110 is updated.

After the training data is generated in step S401, the training unit 106, in step S402, trains the natural language model 121 using the generated training data. In the present embodiment, the positive pairs and negative pairs included in the training data are pairs of brand names, as described with reference to FIG. 4B. The training unit 167 inputs the two brand names included in each positive pair to the natural language model 121 and generates a feature vector for each of the two brand names (feature vectors of the positive pairs). The training unit 106 then embeds the feature vectors of the positive pairs in a common vector space and trains the natural language model 121 so as to minimize the distance between the feature vectors of each positive pair. Also, the training unit 106 inputs the two brand names included in each negative pair to the natural language model 121 and generates a feature vector for each of the two brand names (feature vectors of the negative pairs). The training unit 106 then embeds the feature vectors of the negative pairs in the common vector space and trains the natural language model 121 so as to maximize the distance between the feature vectors of each negative pair. The natural language model 121 is thereby trained with regard to the user 11, such that the feature vectors of brand names that are relatively likely to be purchased in line with purchase records are close to each other in the common vector space. On the other hand, the natural language model 121 is trained with regard to the user 11, such that the feature vectors of brands that are relatively unlikely to be purchased are far apart from each other in the common vector space. That is, a natural language model 121 is generated that has learned the purchasing tendencies of a particular user, which in the present example is the user 11, and is personalized (customized) for the user 11.

The training unit 106 is able to calculate the distance between the feature vectors in the common vector space as a cosine distance or an Euclidean distance. The cosine distance corresponds to a cosine value (from −1 to +1) of the angle formed by two vectors in a common vector space, and the Euclidean distance corresponds to a normal distance representing how far apart two vectors are in a common vector space. Also, minimization and maximization criteria (i.e., accuracy of targeted training) can be set as appropriate. The training unit 106 stores the trained natural language model 121 in the model information storage unit 120.

(2) Procedure of Processing for Reranking Search Query Candidates

Figure 5A:
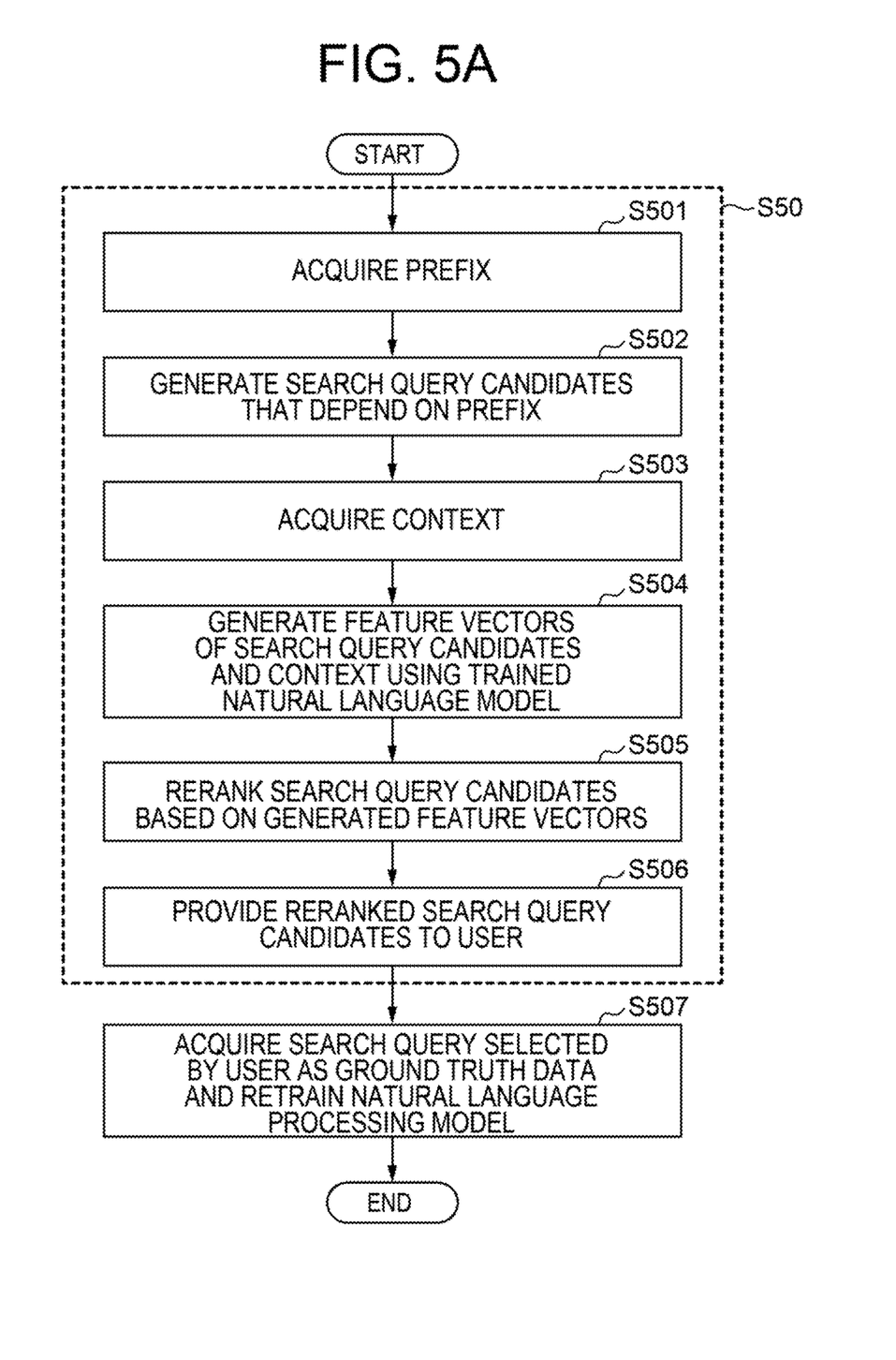
FIG. 5A shows a flowchart of processing for reranking search query candidates that is executed by the information processing apparatus.
Figure 5B:
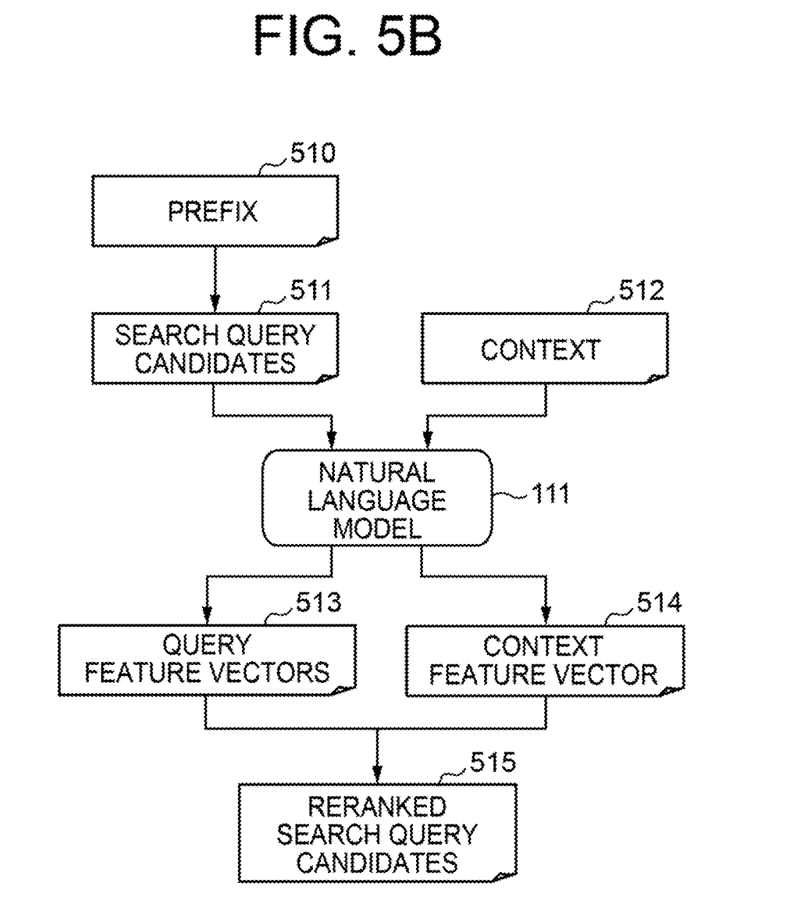
FIG. 5B shows the flow of data in the processing for reranking search query candidates based on a prefix.

Next, the procedure of processing for reranking search query candidates that is executed by the information processing apparatus 20 according to the present embodiment will be described, with reference to FIGS. 5A and 5B. FIG. 5A shows a flowchart of processing for reranking search query candidates that is executed by the information processing apparatus 20. This processing is implemented when the information processing apparatus 20 receives a prefix from the user 11, after the natural language model 121 is trained by the training unit 106. FIG. 5B shows the flow of data in the processing for reranking search query candidates that are based on a prefix input by the user 11.

In FIG. 5A, the processing of step S501 to step S506 included in step S50 can be repeated every time a prefix is acquired in step S501. In step S501, the input data acquisition unit 101 acquires the prefix (corresponds to prefix 510 in FIG. 5) of a search query for the user 11 to search for a desired item on the EC site provided by the information processing apparatus 20.

In step S502, the query candidate generation unit 103 generates a plurality of search query candidates (correspond to search query candidates 511 in FIG. 5B) that depend on the prefix acquired in step S501. The query candidate generation unit 103 is able to generate the plurality of search query candidates, by auto-completing the prefix acquired by step S501, using an existing technology. Also, in step S503, the context acquisition unit 102 acquires a context (corresponds to context 512 in FIG. 5B) representing a feature relating to the search by the user 11. In the present embodiment, the context of the user 11 is the search query last input by the user 11 prior to inputting the prefix in step S501 on the same EC site as the EC site that the user 11 is currently viewing. Note that if there is no search query last input by the user 11 on the same site, the context acquisition unit 102 may acquire other information relating to the search by the user 11 as the context. Other information relating to the search by the user 11 may, for example, be acquired from the input log of the user 11 in past browsing sessions. Note that the processing of step S502 and the processing of step S503 may be performed in reverse order or may be performed at the same time.

In step S504, the reranking unit 104 inputs each of the plurality of search query candidates generated in step S502 to the trained natural language model 121 and generates a query feature vector (corresponds to query feature vectors 513 in FIG. 5B) representing a feature of the search query candidate. Also, in step S504, the reranking unit 104 inputs the context acquired in step S503 to the trained language model 121 and generates a context feature vector (corresponds to context feature vector 514 in FIG. 5) representing a feature of the context. The reranking unit 104 thereby generates the plurality of query feature vectors corresponding to the plurality of search query candidates and the context feature vector corresponding to the context. Note that the processing for generating the plurality of query feature vectors and the processing for generating the context feature vector may be performed in the reverse order. Also, in the present embodiment, in order to acquire the plurality of query feature vectors and the context feature vector, one natural language model 121 is used, but two trained natural language models 121 may be used. In the case of using two natural language models 121, the processing for generating the plurality of query feature vectors and the processing for generating the context feature vector can be performed substantially at the same time.

When the plurality of query feature vectors and the context feature vector are generated in step S504, next, the reranking unit 104, in step S505, embeds each of the query feature vectors and the context feature vector in a common vector space. The reranking unit 104 then calculates the distance from each of the query feature vectors to the context feature vector in the common vector space, and reranks the search query candidates, based on the calculated distances. The distances are, for example, cosine distances or Euclidean distances. The reranking unit 104 reranks the plurality of search query candidates so as to be arranged in order from the search query candidate corresponding to the query feature vector that is the shortest distance from the context feature vector in the common vector space. If there are a plurality of query feature vectors that are the same distance from the context feature vector, the reranking unit 104 may perform reranking, based on any appropriate rule. As aforementioned, the natural language model 121 has been trained such that the relevance of the feature represented by two generated feature vectors increases as the distance between the feature vectors in the common vector space is shorter, and thus a query feature vector that is a shorter distance from the context feature vector can be said to have a higher relevance with the context feature vector. The reranking unit 104 generates reranked search query candidates (correspond to reranked search query candidates 515 in FIG. 5B).

When the reranking is completed, the output unit 107, in step S506, provides the plurality of reranked search query candidates to the user 11. For example, the output unit 107 transmits the search query candidates to the user device 10, so as to display the plurality of reranked search query candidates on the display unit of the user device 10.

The processing of step S50 which includes step S501 to step S506 is repeated every time a prefix is acquired in step S501. Then, when, in response to the user 11 selecting one search query from the plurality of search query candidates provided in step S506, the user input acquisition unit 101 receives the selected search query, the processing of step S50 is completed, and the processing proceeds to step S507. The search query selected by the user 11 corresponds to ground truth data with respect to the plurality of search query candidates provided to the user 11. In step S507, the training unit 106 acquires the search query selected by the user 11 as ground truth data and retrains the natural language processing model 121 using the ground truth data.

In this way, the information processing apparatus 20 according to the present embodiment is able to train the natural language model 121 so as to be personalized for the user 11, by training the natural language model 121, using training data generated based on information relating to purchases by the user 11. Here, the natural language model 121 functions as a dual encoder and is trained using positive pairs (pairs of pieces of information of items that are based on purchase records) and negative pairs (pairs other than the positive pairs) generated as information relating to purchases. The information processing apparatus 20 then uses the result generated by inputting the plurality of search query candidates that are based on the prefix input by the user 11 and the context representing the feature relating to the most recent search by the user 11 to the trained natural language processing model to rerank the plurality of search query candidates. As a result of such reranking, reranking that reflects the purchasing tendencies of the user 11 is realized. The user 11 who is presented with the reranked search query candidates is then able to efficiently search for an intended item.

Also, in the present embodiment, the user 11 uses the last search query on the same EC site as a context. It thereby becomes possible for the information processing apparatus 20 to perform reranking in real time and without increasing the processing load. That is, the time from when a prefix is input by the user 11 to when the search query candidates are presented to the user 11 can be shortened, and usability can be improved.

Note that although a specific embodiment has been described above, the embodiment is a mere example and is not intended to limit the scope of the invention. The apparatus and method described in this specification may be implemented in forms aside from the embodiment described above. It is also possible to appropriately make omissions, substitutions, and modifications to the embodiment described above without departing from the scope of the invention. Implementations with such omissions, substitutions, and modifications are included in the scope of the patent claims and their equivalents, and belong to the technical scope of the present invention.

The disclosure includes the following embodiments.

[1] An information processing apparatus comprising: a prefix acquisition unit configured to acquire a prefix input on an EC (E-Commerce) site by a user; a context acquisition unit configured to acquire a context representing a feature relating to a search on the EC site by the user; a candidate acquisition unit configured to generate a plurality of search query candidates, based on the prefix; and a reranking unit configured to rerank the plurality of search query candidates, using a result generated by inputting the plurality of search query candidates and the context to a natural language processing model trained using information relating to purchases on the EC site by the user.

[2] The information processing apparatus according to [1], wherein the context acquisition unit acquires, as the context, a search query last input on the EC site by the user prior to inputting the prefix.

[3] The information processing apparatus according to [1] or [2], further comprising: a training data generation unit configured to generate training data from information of a plurality of purchased items purchased by the user and information of a plurality of non-purchased items not purchased by the user, among a plurality of items being sold on the EC site; and a training unit configured to train the natural language model, using the training data.

[4] The information processing apparatus according to [3], wherein the training data generation unit generates the training data including a positive pair, which is a pair of pieces of information of two items among the plurality of purchased items, and a negative pair, which is a pair of pieces of information of two items of the plurality of items with at least one piece thereof being information of one of the plurality of non-purchased items, and the training unit generates feature vectors of the positive pair by inputting the pieces of information of the positive pair to the natural language model, and generates feature vectors of the negative pair by inputting the pieces of information of the negative pair to the natural language model, and trains the natural language model so as to minimize a distance between the feature vectors of the positive pair and to maximize a distance between the feature vectors of the negative pair in a common vector space.

[5] The information processing apparatus according to [4], wherein the pieces of information of the two items are brand names of the two items.

[6] The information processing apparatus according to any one of [1] to [5], wherein the reranking unit generates a plurality of query feature vectors respectively representing features of the search query candidates by inputting each of the plurality of search query candidates to the trained natural language model, and generates a context feature vector representing a feature of the context by inputting the context to the trained natural language model, and reranks the plurality of search query candidates, based on a distance from each of the plurality of query feature vectors to the context feature vector in a common vector space.

[7] The information processing apparatus according to [6], wherein the reranking unit reranks the plurality of search query candidates, such that the plurality of query feature vectors are arranged in order from the search query candidate corresponding to the query feature vector that is a shortest distance from the context feature vector.

[8] The information processing apparatus according to any one of [1] to [7], wherein the natural language model is a pretrained BERT (Bidirectional Encoder Representations from Transformers).

[9] The information processing apparatus according to any one of [1] to [8], further comprising: an output unit configured to provide the reranked search query candidates to the user.

REFERENCE SIGNS LIST

10: User device
11: User
20: Information processing apparatus
101: User input acquisition unit
102: Context acquisition unit
103: Query candidate generation unit
104: Reranking unit
105: Training data generation unit
106: Training unit
107: Output unit
110: Purchase history database
120: Model information storage unit
121: Natural language model
122: Training data

What is claimed is:
1. An information processing apparatus comprising:
at least one memory configured to store program code;
at least one processor configured to operate as instructed by the program code, the program code including:
prefix acquisition code configured to cause at least one of the at least one processor to acquire a prefix input on an EC (E-Commerce) site by a user;
context acquisition code configured to cause at least one of the at least one processor to acquire a context representing a feature relating to a search on the EC site by the user;
candidate acquisition code configured to cause at least one of the at least one processor to generate a plurality of search query candidates, based on the prefix;
reranking code configured to cause at least one of the at least one processor to rerank the plurality of search query candidates, using a result generated by inputting the plurality of search query candidates and the context to a natural language processing model trained using information relating to purchases on the EC site by the user;

training data generation code configured to cause at least one of the at least one processor to generate training data including a positive pair comprising information of two items among a plurality of purchased items purchased by the user, and a negative pair comprising information of two items with at least one being information of a non-purchased item not purchased by the user, among a plurality of items being sold on the EC site; and training code configured to cause at least one of the at least one processor to:

generate feature vectors of the positive pair and feature vectors of the negative pair by inputting the information to the natural language processing model, and train the natural language processing model to minimize a distance between the feature vectors of the positive pair and maximize a distance between the feature vectors of the negative pair in a common vector space.

2. The information processing apparatus according to claim 1,
wherein the context acquisition code is further configured to cause at least one of the at least one processor to acquire, as the context, a search query last input on the EC site by the user prior to inputting the prefix.

3. The information processing apparatus according to claim 1, wherein the information of the two items are brand names of the two items.

4. The information processing apparatus according to claim 1,
wherein the reranking code is further configured to cause at least one of the at least one processor to
generate a plurality of query feature vectors respectively representing features of the search query candidates by inputting each of the plurality of search query candidates to the trained natural language model, and generates a context feature vector representing a feature of the context by inputting the context to the trained natural language model, and
rerank the plurality of search query candidates, based on a distance from each of the plurality of query feature vectors to the context feature vector in a common vector space.

5. The information processing apparatus according to claim 4,
wherein the reranking code is further configured to cause at least one of the at least one processor to rerank the plurality of search query candidates, such that the plurality of query feature vectors are arranged in order from the search query candidate corresponding to the query feature vector that is a shortest distance from the context feature vector.

6. The information processing apparatus according to claim 1,
wherein the natural language model is a pretrained BERT (Bidirectional Encoder Representations from Transformers).

7. The information processing apparatus according to claim 1, further comprising:
output code configured to cause at least one of the at least one processor to provide the reranked search query candidates to the user.

8. The information processing apparatus according to claim 1, further comprising:
display code configured to cause at least one of the at least one processor to transmit the reranked plurality of search query candidates to a user device and display in a selection interface, wherein display of the reranked plurality of search query candidates reduces a number of characters input by the user.

9. The information processing apparatus according to claim 1, wherein the context represents real-time search tendencies of the user within a current browsing session on the EC site.

10. The information processing apparatus according to claim 1, wherein the natural language model comprises a dual encoder that embeds feature vectors in a common vector space, wherein distances between the feature vectors in the common vector space represent relevance between respective features.

11. The information processing apparatus according to claim 1, wherein the reranking code is further configured to cause at least one of the at least one processor to rerank the plurality of search query candidates to reflect purchasing tendencies of the user on the EC site in real-time.

12. An information processing method, performed by at least one processor and comprising:
acquiring a prefix input on an EC (E-Commerce) site by a user;
acquiring a context representing a feature relating to a search on the EC site by the user;
generating a plurality of search query candidates, based on the prefix;
reranking the plurality of search query candidates, using a result generated by inputting the plurality of search query candidates and the context to a natural language processing model trained using information relating to purchases on the EC site by the user;
generating training data including a positive pair comprising information of two items among a plurality of purchased items purchased by the user, and a negative pair comprising information of two items with at least one being information of a non-purchased item not purchased by the user, among a plurality of items being sold on the EC site;
generating feature vectors of the positive pair and feature vectors of the negative pair by inputting the information to the natural language processing model; and
training the natural language processing model to minimize a distance between the feature vectors of the positive pair and maximize a distance between the feature vectors of the negative pair in a common vector space.

13. A non-transitory computer readable medium storing a computer program that when executed by at least one processor, causes the at least one processor to:
acquire a prefix input on an EC (E-Commerce) site by a user;
acquire a context representing a feature relating to a search on the EC site by the user;
generate a plurality of search query candidates, based on the prefix;
rerank the plurality of search query candidates, using a result generated by inputting the plurality of search query candidates and the context to a natural language processing model trained using information relating to purchases on the EC site by the user;
generate training data including a positive pair comprising information of two items among a plurality of purchased items purchased by the user, and a negative pair comprising information of two items with at least one being information of a non-purchased item not purchased by the user, among a plurality of items being sold on the EC site;

generate feature vectors of the positive pair and feature vectors of the negative pair by inputting the information to the natural language processing model; and train the natural language processing model to minimize a distance between the feature vectors of the positive pair and maximize a distance between the feature vectors of the negative pair in a common vector space.

\* \* \* \* \*